United States Patent Office 3,660,444
Patented May 2, 1972

---

3,660,444
PROCESS FOR THE PRODUCTION OF PYROLYSATES AND THEIR USE AS STABILIZERS
Peter Kartschmaroff, Waldstrasse 6, Arlesheim, Basel-Land, Switzerland; Paul Moser, Hauensteinstrasse 108, Basel, Switzerland, and Kurt Berger, Grabenmattweg 9, Allschwil, Basel-Land, Switzerland
No Drawing. Filed July 16, 1970, Ser. No. 55,615
Claims priority, application Switzerland, July 31, 1969, 11,650/69
Int. Cl. C07f 15/04; C08f 45/62
U.S. Cl. 260—439 R                            8 Claims

ABSTRACT OF THE DISCLOSURE

Pyrolysates are produced by heating the nickel salts of phosphonic acid semiesters. The obtained pyrolysates are stabilizers for synthetic high-molecular materials.

---

DESCRIPTION OF THE INVENTION

The present invention relates to a process for the production of pyrolysates of nickel salts of phosphonic acid semiesters, to their use for the stabilising of synthetic polymers, and to the polymers stabilised therewith.

The use of nickel salts of certain phosphonic acid semiesters as stabilisers in polymeric materials is known from the U.S.A. Pat. 3,310,575. The polymers into which such nickel salts have been incorporated exhibit a god stability, e.g. to light and to the action of heat, and also improved dyeability. However, the incorporation of these salts into the polymeric materials does have disadvantages, in that the master batches advantageously used for this incorporation may only contain a limited amount of nickel salts, so that no undesired evolution of gas occurs as a result of splitting-off volatile substances, such as water, alcohols etc.

The process according to the invention enables stabilisers to be obtained which render possible production of concentrated, usable master batches and which, after incorporation into the polymers, are moreover more stable to extraction that the prior known non-pyrolysated nickel phosphonates.

It is characterised in that a compound of Formula I:

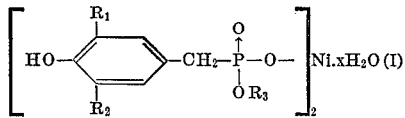

wherein $R_1$, $R_2$, and $R_3$ represent, independently of each other, an alkyl group having 1 to 5 carbon atoms, such as methyl, ethyl, propyl and butyl or aryl group, or
$R_1$ and $R_2$ also represent the 1-methylcyclohexyl group, and
$x$ represents 0.5 to 3, is heated to 160 to 300° C., and the constituents volatile at this temperature are removed.

The groups $R_1$ and $R_2$ are, for example, α-branched alkyl groups such as iso-propyl or tert.butyl and, advantageously, at least one of them is the tertiary butyl group; $R_1$ and $R_2$ preferably represent the tertiary butyl group.

With regard to the water molecules which the starting compound contains in an x-fold amount, it is a case of crystal water and solvate water, which is not bound in a stoichiometrical manner to the nickel compound $x$ thus represents a mean value which can be analytically determined.

The starting materials can be obtained in the known manner which is given in the above stated U.S.A. patent. A far more simple manner of obtaining them is by starting with diesters of Formula II:

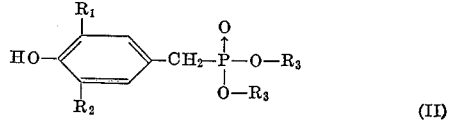

wherein the radicals $R_1$, $R_2$ and $R_3$ have the same meanings as given in Formula I; saponifying these in an aqueous medium with sodium or potassium hydroxide solution to give the monosodium salt or monopotassium salt of the corresponding monoester; neutralising or slightly acidifying the reaction mixture after saponification; and thereupon adding an aqueous solution of a nickel salt. The nickel salt of the monoester then precipitates out in crystalline form.

According to the invention, the starting materials are heated to 160 to 300° C., whereby volatile constituents, consisting mainly of water and of the alcohol component of the respective semiester, split off. The pyrolysis process can be thereby clearly observed and progressively assessed. The degree of pyrolysis, i.e. the amount of volatile cleavage products, can vary within wide limits, without the effectiveness of the products being impaired as a result. The higher the temperature chosen, the shorter is, in general, the reaction time; this is, e.g. at 270–300° C. about 10–40 minutes; at 240° C. it is about three hours. It is, of course, necessary to take into account, with high temperatures, a series of secondary reactions which are not always desired, particularly when the temperature is raised to a high level immediately at the commencement of pyrolysis. Preferably, heating is initially kept below 200° C., e.g. at 170° C., and the temperature then gradually raised, e.g. to 230° C. A useful temperature range is from 190° C. to 240° C. If temperatures below 200° C. are used, then the reaction time is correspondingly longer.

The reaction may be carried out either with or without solvent. Suitable organic solvents are inert solvents, e.g. white oil or diphenyl ether.

The pyrolysates obtained according to the invention are good stabilisers for synthetic high-molecular materials, e.g. for polymers (solid at room temperature) made from α-olefins having 2 to 5 carbon atoms; especially for polypropylene. They protect these materials, e.g. against decomposition under the action of light, heat and oxygen. They can be used to produce synthetic-material-mixtures having high concentrations—so-called master-batches. In spite of the brown-yellow colour of the pyrolysates, these impart to the substrates a bottom colour which is lighter than that imparted by the light-green starting materials. Synthetic-material-mixtures with the pyrolysates undergo, moreover, practically no discolouration (or only a very slight amount) at elevated temperatures, or in boiling water. Furthermore, the pyrolysates in the therewith treated substrates are more resistant to extraction with solvents than are the starting products.

The temperatures are given in degrees centigrade in the following examples.

EXAMPLE 1

The nickel salt of 3,5-di-tert.butyl-4-hydroxybenzyl-phosphonic acid monomethyl ester is applied, in a ca. 5 mm. thick layer, to a heating surface, and the temperature of this is maintained for 1½ hours at 240°, whereby a weak stream of nitrogen is passed through the reaction vessel. The sintered mass is then cooled in the nitrogen stream and, with the exclusion of moisture, ground. A yellow-brown powder is obtained which is readily soluble in organic solvents, and which can be easily incorporated into polyolefins.

A preparation having properties corresponding to a great extent to those of the described product, the pyrolysis of which has, however, advanced somewhat further, is obtained by proceeding as above, but applying a heating-surface temperature of 280°.

The starting product is produced according to the following prescription: 34.2 g. (0.1 mole) of 3,5-ditert.butyl-4-hydroxybenzylphosphonic acid dimethyl ester are suspended, in a pressure vessel, in 40 ml. of water and 22.4 g. of 30% potassium hydroxide solution (0.12 moles). This mixture is heated, under nitrogen, until an excess pressure of 1.8 to 2.0 atm. is attained, which corresponds to a temperature of 125–130°. This pressure is maintained for hours by heat being supplied. After dilution with 60 ml. of water, the pH-value of the reaction mixture is lowered to 6.0 by the addition of ca. 2.4 g. of 30% hydrochloric acid; and the solution is then cleared by filtration. A solution of 11.9 g. (0.05 mole) of nickel chloride hexahydrate in 6 ml. of water is added dropwise at 35–40°, in the course of one hour, to the filtrate containing the potassium salt of 3,5-di-tert.butyl-4-hydroxybenzylphosphonic acid monomethyl ester; and the thereby formed crystalline suspension is afterwards stirred at the same temperature for half an hour. The mother liquor is separated by centrifuging; the precipitate is washed with 25 ml. of water; and the blue-green product is subsequently dried at a pressure of 11 mm. Hg at 70–80°, until constant weight is attained. A yellow powder is obtained, the elementary composition of which corresponds to that of a nickel salt (still containing 2–4% water) of the above stated semiester. The yield is 95% of the theoretical value.

EXAMPLE 2

By starting with the nickel salt of 3,5-di-tert.butyl-4-hydroxybenzylphosphonic acid monoethyl ester, but otherwise proceeding as described in Example 1, a product is obtained possessing very similar properties to those of the pyrolysis product from Example 1, and which is suitable, in the same manner, for incorporation into polyolefins.

A product having properties corresponding substantially to those of the described preparation, the pyrolysis of which, however, has advanced somewhat further, is obtained by proceeding as described in Example 1, but applying a heating-surface temperature of 280°.

The starting product is produced according to the following prescription: 35.6 g. (0.1 mole) of 3,5-di-tert.butyl-4-hydroxybenzylphosphonic acid diethyl ester are suspended, in a pressure vessel, in a mixture of 16 g. of 30% sodium hydroxide solution (0.12 mole) and 40 ml. of water. The mixture is then heated, under nitrogen, until an excess pressure of 1.8 to 2.0 atm. obtains, corresponding to a temperature of 125–130°. This pressure is maintained for 5 hours by heat being supplied. After dilution with 60 ml. of water, the pH-value of the reaction mixture is lowered to 6.0 by the addition of ca. 2.4 g. of 30% hydrochloric acid; and the solution is cleared by filtration. To the filtrate containing the sodium salt of 3,5-di-tert.butyl-4-hydroxybenzylphosphonic acid monoethyl ester is added dropwise at 35–40°, in the course of one hour, a solution of 11.9 g. (0.05 mole) of nickel chloride hexahydrate in 6 ml. of water; and the thereby formed crystalline suspension is subsequently stirred for half an hour at the same temperature. The mother liquor is separated by centrifuging; the blue-green precipitate is washed with 25 ml. of water and dried under a pressure of 11 mm. Hg at 70—80°, until the weight remains constant. A yellow powder is obtained, the elementary composition of which corresponds to that of a nickel salt (still containing 2–4% water) of the above stated semiester. The yield is 95% of the theoretical value.

EXAMPLE 3

By starting with the nickel salt of 3,5-di-tert.-butyl-4-hydroxybenzylphosphonic acid mono-n-butyl ester, but otherwise proceeding as described in Example 1, a product is obtained which possesses very similar properties to those of the pyrolysis product from Example 1; and which is suitable, in the same manner, for incorporation into polyolefins.

A product having properties corresponding, to a great extent, to those of the described preparation, the pyrolysis of which, however, has advanced somewhat further, is obtained by proceeding as described in Example 1, but applying a heating-surface temperature of 280°.

The starting product may be producted according to U.S. 3,310,575 (Example 4), or according to the following process: 35.6 g. (0.1 mole) of 3,5-di-tert.butyl-4-hydroxybenzylphosphonic acid mono-n-butyl ester are dissolved in 100 ml. of ethanol and converted, by the addition of 10 ml. of a 10-n aqueous sodium hydroxide solution, into the monosodium salt. To this solution are added dropwise 11.8 g. (0.05 mole) of nickel chloride hexahydrate in 40 ml. of ethanol, whereby a sodium chloride suspension is formed, which is heated for half an hour to 55°.

At the same temperature, 170 ml. of water are added dropwise and the emulsion, thereby formed after the dissolving of the suspension, is stirred, with slow cooling, until a crystalline preciiptate occurs. It is filtered off under suction, washed with 10% ethanol until free of sodium chloride, and then dried at 80° and under a pressure of 11 mm. Hg for 20 hours.

EXAMPLE 4

10 g. of the nickel salt of 3,5-di-tert.-butyl-4-hydroxybenzylphosphonic acid monoethyl ester are suspended in 120 ml. of diphenyl ether, and the mixture is stirred under nitrogen for one hour at 230°, whereby the nickel phosphonate dissolves. This solution is concentrated by the crystallising out of the diphenyl ether at −80°, and the residual diphenyl ether is removed by sublimation in vacuo (0.1 mm. Hg) with a bath temperature of 80–90°. After grinding of the residue, a yellow-brown product is obtained which is readily soluble in organic solvents, and which can be easily incorporated into polyolefins.

By starting with the nickel salt of 3,5-di-tert.-butyl-4-hydroxybenzylphosphonic acid monomethyl ester, or with the nickel salt of 3,5-di-tert.-butyl-4-hydroxybenzylphosphonic acid mono-n-butyl ester, but otherwise proceeding as described in this example, pyrolysates are obtained, the properties of which substantially correspond with those of the product described in this example.

EXAMPLE 5

40 g. of polypropylene are plasticised in a roller-kneader set 200°, and simultaneously homogenised for 10 minutes with 200 mg. of pyrolysates produced according to Example 2. From the synthetic-material-mass, 1 mm. thick plates are pressed in a hydraulic press at 200°.

The resistance to heat-ageing of the polypropylene plates stabilised with the pyrolysate was determined in an air-circulation furnace. As a control, parallel tests were carried out on specimens which had been produced without the addition of pyrolysates, but otherwise under the same conditions. In the following table, the time in hours is given which was required to produce embrittlement or decomposition of the specimens.

RESISTANCE TO HEAT-AGEING-IN-THE-AIR-CIRCULATION OVEN

| Test temperature | 149° | 135° |
|---|---|---|
| Stabilised with the pyrolysate, hours | 450 | 2,900 |
| Control, hours | 20 | 110 |

The colour and colour-stability of the plate-specimens stabilised with the pyrolysate was assessed at 200° pressing-temperature, as well as after 5 days oven-ageing, and also after 7 days boiling in distilled water, the assessment being made with the aid of a colour-scale, according to which 1 represents the greatest degree of discolouration and 5 the lowest degree. As a control, specimens were assessed which contained as stabiliser, instead of the pyrolysate, the corresponding non-pyrolysated nickel phosphonate, but which had otherwise been produced under the same conditions.

COLOUR ASSESSMENT

|  | Press temperature 200° | After 5 days oven-ageing | After 7 days boiling |
|---|---|---|---|
| Stabilised with the pyrolysate | 3-4 | 1-2 | 3-4 |
| Control, stabilised with the non-pyrolysated nickel phosphonate | 2-3 | <1 | 2-3 |

EXAMPLE 6

Polypropylene is processed, as described in Example 5, with the pyrolysate produced according to Example 3; and it is then pressed at 200° into plates or into sheets.

Colour and colour-stability of the stabilised polypropylene plates are determined as in Example 5.

COLOUR ASSESSMENT

|  | Press temperature 200° | After 5 days oven-ageing | After 7 days boiling |
|---|---|---|---|
| Stabilisied with the pyrolsate | 4 | 1-2 | 4 |
| Control, stabilised with the non-pyrolysated nickel phosphonate | 1-2 | <1 | 1-2 |

The extraction-stability of the pyrolysate in polypropylene sheets was tested in comparison with the non-pyrolysated nickel phosphonate which, in itself has good compatibility in polypropylene.

EXTRACTION-STABILITY MEASURED ON 0.3 MM. THICK POLYPROPYLENE SHEETS

Extraction conditions: 500 mg. of sheet in 24 ml. of CHCl₃ at room temperature. Determination of the extracted amount of stabiliser by means of spectrophotometric measurement of the residual concentration in the sheet. The values given represent the loss in percent of the initial concentration.

| Extraction time min | 30 | 200 |
|---|---|---|
| Stabilised with the pyrolysate | 12 | 26 |
| Control, stabilised with the non-pyrolysated nickel phosphonate | 24 | 49 |

It is shown that the pyrolysate is appreciably more stable to extraction than the corresponding non-pyrolysated nickel phosphonate.

EXAMPLE 7

100 parts of polypropylene are homogenised for 10 minutes at 185–195° on a friction roll mill, with 0.5 part by weight of pyrolysate produced according to Example 2. From the rolled sheet are pressed, in a hydraulic press at 300°, 1 mm. thick plates.

The colour of the plates, assessed according to Example 5, is 3, whilst the control specimens, stabilised with the non-pyrolysated nickel phosphonate, give the colour-value 1–2.

Similar results are obtained when polyethylene is used instead of polypropylene.

EXAMPLE 8

Polypropylene is processed, as described in Example 7, with the pyrolysate produced according to Example 3; and it is then pressed out at 300° into 1 mm. thick plates or 0.3 mm. thick sheets.

The colour of the plates, assessed according to Example 5, is 3, whereas the control specimens, stabilised with the non-pyrolysated nickel phosphonate, give the colour-value 1–2.

The extraction-stability of the pyrolysate in the polypropylene sheet, determined according to Example 6, is as follows:

EXTRACTION-STABILITY

| Extraction time, min | 30 | 200 |
|---|---|---|
| Stabilised with the polysate | 13 | 27 |
| Control, stabilised with the non-pyrolysated nickel phosphonate | 27 | 43 |

EXAMPLE 9

100 parts by weight of polypropylene flakes are impregnated with 1.0 part by weight of pyrolysate produced according to Example 4. This material is extruded on a screw press with a temperature pattern up to 275°, and then granulated.

The thus obtained granulate is extruded and granulated 5 times in succession under the same conditions, i.e. at 275°. The melting index, afterwards determined according to ASTM D 1238, is 5. The sample melted under the same conditions, but containing no pyrolysate, gave, with the same test, a melting index of 15.

EXAMPLE 10

100 parts by weight of polypropylene are processed with 10 parts by weight of pyrolysate, produced according to Example 3, on a Co-kneader at 240° into a master batch. No disturbing secondary effects, such as foaming up or bubble formation, can thereby be observed.

In contrast to this, the production of such a master batch using non-pyrolysated nickel phosphonate, under otherwise the same conditions, is not possible, since the split off volatile constitutents cause an excessive swelling up of the material and lead to inhomogeneity of the mass.

EXAMPLE 11

100 parts by weight of polypropylene (fibre grade) are pre-homogenised and granulated with 0.1 part by weight of phenolic antioxidant and 0.5 part by weight of pyrolysate produced according to Example 2. This granulate is processed on a melt-spinning machine at 265° into multifilaments, and afterwards further drawn, in the ratio 1:4, over a heating-block at 160°. The total degree of stretching thus attained is 1:8. The titre of the polypropylene fibres obtained in this manner is 130 den. The resistance to heat-ageing of the polypropylene multifilament stabilised with the pyrolysate, determined in an air-circulation oven at 135° according to Example 5, is 80 hours, whilst that of a multifilament produced without the addition of pyrolysate, but otherwise under the same conditions, amounts to only 4 hours.

The fastness to light of the polypropylene multifilament stabilised with the pyrolysate was determined in the Xenotest 150 apparatus. As a control, a multifilament was tested which had been produced under the same conditions, but which contained no pyrolysate stabiliser. As a measure of the service-life of the material, the time in hours is given at which the ultimate tensile strength of the multifilaments has decreased to 50% of the initial value.

Fastness to light in the Xenotest 150

|  | H. |
|---|---|
| Stabilised with the pyrolysate | 1700 |
| Control | 550 |

EXAMPLE 12

100 parts by weight of polypropylene powder are homogenised with 0.1 part by weight of phenolic antioxidant and with 0.5 part by weight of pyrolysate produced according to Example 3; and the mixture is then extruded at 240° through a slot die. The cooled extruded material is afterwards passed continuously through a heating-channel at 130 to 180°, and simultaneously drawn out in the ratio 1:12. The thickness of the thus obtained tapes is 0.06 mm.

The resistance to heat-ageing of the polypropylene sheet tapes stabilised with the pyrolysate, determined in the air-circulation oven at 135°, according to Example 5, is 850 hours; whilst that of sheet tapes produced without the addition of pyrolysate, but otherwise under the same conditions, amounts to only 60 hours.

The fastness to light of the sheet tapes, tested in the Xenotest 150, according to Example 11, was 2050 hours; whereas the fastness to light of the sheet tapes without addition of pyrolysate was only 910 hours.

What we claim is:

1. Process for the production of pyrolysates of nickel salts of phosphonic acid semiesters, comprising a compound of the Formula I

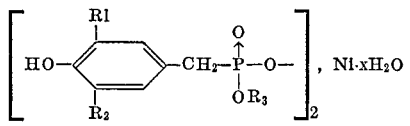

(1)

wherein $R_1$, $R_2$ and $R_3$ represent, independently of each other, an alkyl group having 1 to 5 carbon atoms, or $R_1$ and $R_2$ also represent the 1-methylcyclohexyl group, and $x$ represents 0.5 to 3, is heated to 160–300° C.; and the constituents volatile at this temperature are removed.

2. Process according to claim 1, wherein $R_1$ and $R_2$ represent α-branched alkyl groups.

3. Process according to claim 2, wherein at least one of $R_1$ and $R_2$ represents the tertiary butyl group.

4. Process according to claim 3, wherein $R_1$ and $R_2$ represent the tertiary butyl group.

5. Process according to claim 1 wherein the compound of the Formula I is heated to 190 to 240° C.

6. Process according to claim 1 wherein that heating is carried out without the addition of a solvent.

7. Process according to claim 1 wherein the pyrolysis is performed in an inert solvent.

8. Pyrolysate produced according to claim 1.

References Cited

UNITED STATES PATENTS 3,310,575   3/1967   Spivak _____ 260—429

DELBERT E. GANTZ, Primary Examiner

A. P. DEMERS, Assistant Examiner

U.S. Cl. X.R.

260—45.75 N